United States Patent
McGuffin

(10) Patent No.: US 8,238,962 B2
(45) Date of Patent: Aug. 7, 2012

(54) SYSTEM AND METHOD FOR GROUND STATION SELECTION

(75) Inventor: Thomas F. McGuffin, Seattle, WA (US)

(73) Assignee: Honeywell International Inc., Morristown, NJ (US)

(*) Notice: Subject to any disclaimer, the term of this patent is extended or adjusted under 35 U.S.C. 154(b) by 721 days.

(21) Appl. No.: 12/338,408

(22) Filed: Dec. 18, 2008

(65) Prior Publication Data

US 2010/0234024 A1    Sep. 16, 2010

(51) Int. Cl.
*H04B 7/00*    (2006.01)

(52) U.S. Cl. ........ 455/525; 455/436; 455/437; 455/438; 455/439; 455/440; 455/441; 455/442; 455/443; 455/444; 370/316; 370/328; 370/331; 370/332

(58) Field of Classification Search .......... 455/436–444, 455/525; 370/316, 328, 331, 332
See application file for complete search history.

(56) References Cited

U.S. PATENT DOCUMENTS

| 7,184,763 | B2 | 2/2007 | Roy et al. |
| 7,359,703 | B2 | 4/2008 | McGuffin et al. |
| 7,379,750 | B2 | 5/2008 | Jalali |
| 7,684,820 | B2* | 3/2010 | McGuffin et al. ............ 455/525 |
| 2006/0217851 | A1* | 9/2006 | McGuffin et al. ................ 701/4 |
| 2006/0223559 | A1 | 10/2006 | Chen et al. |
| 2006/0239238 | A1 | 10/2006 | Fernandez-Corbaton et al. |
| 2010/0056157 | A1* | 3/2010 | Verona et al. ................ 455/438 |

* cited by examiner

*Primary Examiner* — Amancio Gonzalez
(74) *Attorney, Agent, or Firm* — Fogg & Powers LLC

(57) ABSTRACT

A communication system comprises a radio to transmit and receive communication signals to and from a selected ground station; and a management unit coupled to the radio and operable to dynamically set a threshold value for selecting another ground station based on a signal strength corresponding to the selected ground station. The management unit is operable to select another ground station when a signal strength corresponding to the other ground station exceeds the signal strength corresponding to the selected ground station by more than the threshold value set by the management unit.

20 Claims, 5 Drawing Sheets

SYSTEM AND METHOD FOR GROUND STATION SELECTION

BACKGROUND

Typical aircraft communicate with systems on the ground during the course of a flight using a very high frequency (VHF) communications apparatus that operates in a frequency band allocated to aircraft operation. For example, voice communications between aircraft and ground-based air traffic control facilities are generally carried out by means of a VHF communications transceiver that operates in a frequency band from 118.0 MHz to 135.95 MHz on any of a plurality of selectable and discrete channel frequencies in this band. Data may also be communicated between a ground station and an aircraft by coupling a modem to the VHF communications transceiver so that data may be communicated using audio frequency tones. For example, the well-known Aircraft Communications Addressing and Reporting System (ACARS) and the Aeronautical Telecommunications Network (ATN) provide a data link capability so that character-oriented and bit-oriented communications may occur between the ground station and the aircraft.

Since VHF networks are generally limited to line-of-sight propagation, multiple ground stations are needed to communicate with the aircraft during a flight of any significant distance. In particular, as the aircraft traverses its flight path, it will switch to a new ground station based on various factors such as the signal strength of the current ground station and the signal strength of the other ground stations within range of the aircraft. Although, switching to a new ground station is typically done to improve signal strength, each switch between ground stations involves executing hand-off procedures which can also increase network congestion. Since limited channels are allocated for aircraft communications, it is desirable to limit the number of ground station hand-offs in order to limit the increase in network congestion.

SUMMARY

In one embodiment, a communication system is provided. The communication system comprises a radio to transmit and receive communication signals to and from a selected ground station; and a management unit coupled to the radio and operable to dynamically set a threshold value for selecting another ground station based on a signal strength corresponding to the selected ground station. The management unit is operable to select another ground station when a signal strength corresponding to the other ground station exceeds the signal strength corresponding to the selected ground station by more than the threshold value set by the management unit.

DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments. Like reference numbers and designations in the various drawings indicate like elements.

DETAILED DESCRIPTION

Figure 1:
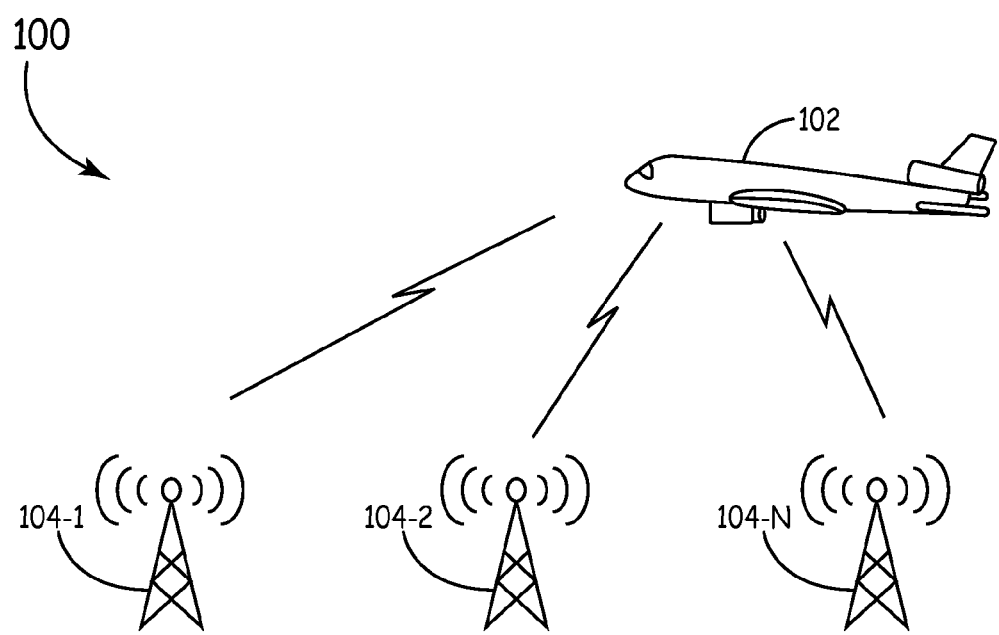
FIG. 1 is a diagram of an avionics communication network.

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures or the specification is not to be construed as limiting the order in which the individual steps may be performed. The following detailed description is, therefore, not to be taken in a limiting sense.

FIG. 1 is a diagram of an avionics communication network 100. In network 100, aircraft 102 communicates data with one of ground stations 104-1 . . . 104-N. In particular, aircraft 102 receives a signal from each of ground stations 104-1 . . . 104-N and selects the ground station with the best signal strength. As aircraft 102 travels toward its destination, the signal strength of communication signals from each of the ground stations 104-1 . . . 104-N changes. For example, the distance between aircraft 102 and each ground station 104, and the presence or absence of obstacles in the line-of-sight between aircraft 102 and each ground station 104, influence the signal strength of respective signals received from each ground station 104 at aircraft 102.

Figure 2:
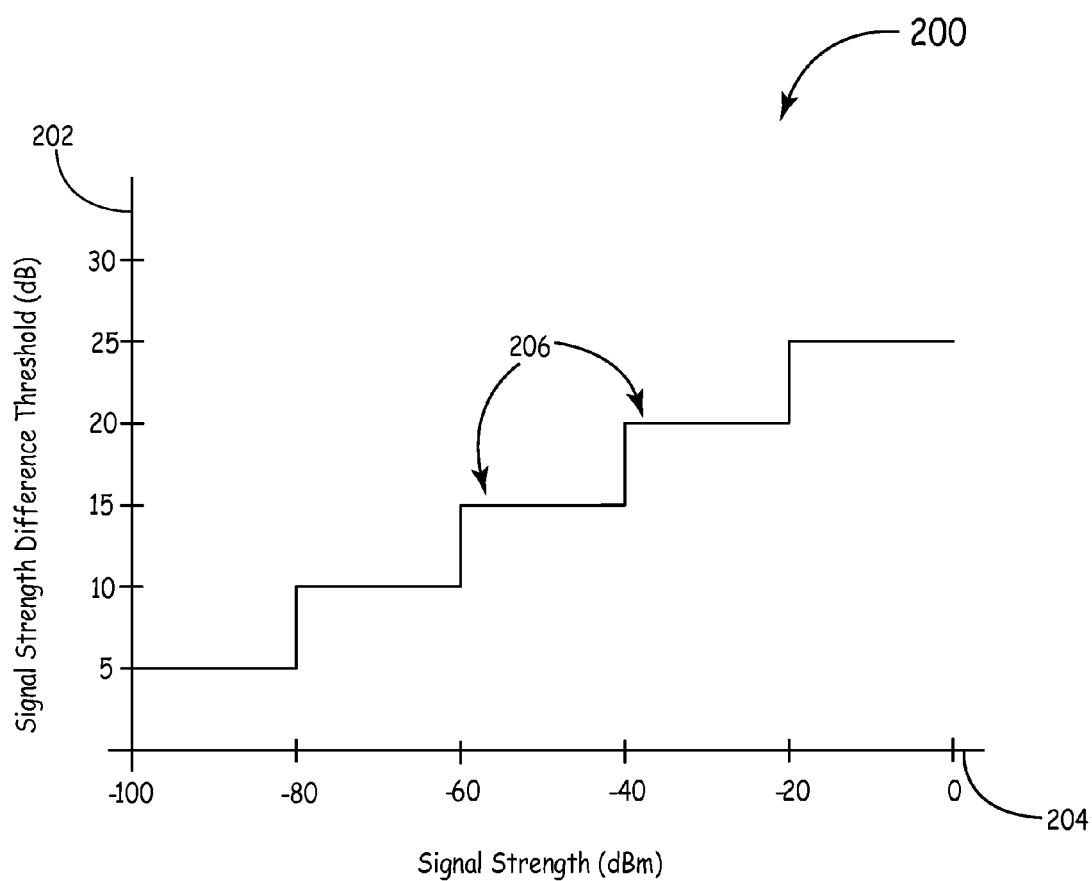
FIG. 2 is an exemplary graph depicting relative signal strength thresholds as a function of absolute signal strength.

Aircraft 102 switches to a new ground station 104 when the difference in signal strength between the currently selected ground station and the new ground station exceeds a dynamic threshold. The dynamic threshold is based on the signal strength of signals received from the currently selected ground station. Thus, if the current signal strength is high, the threshold is also set at a higher level than when the current signal strength is low. In addition, as the current signal strength changes, the dynamic threshold for switching ground stations also changes. For example, FIG. 2 is a graph 200 depicting exemplary values for dynamic threshold as a function of the signal strength. It is to be understood that the values in FIG. 2 are provided by way of example and not by way of limitation and that other values and ranges can be used in other embodiments.

In FIG. 2, the vertical axis 202 represents threshold values and the horizontal axis 204 represents signal strength values. As can be seen in FIG. 2, the threshold value increases as the signal strength value increases. In particular, the exemplary embodiment shown in FIG. 2 includes five threshold values or steps 206. Each step 206 corresponds to a range of signal strength values. For example, in the exemplary embodiment of FIG. 2, if the signal strength is between −80 dbm and −60 dbm, the threshold for switching ground stations is set at 10 db. However, if the signal strength is greater than −20 dbm, the threshold for switching is set at 25 db. Although five steps 306 are shown in FIG. 2, it is to be understood that any number of steps can be used in other embodiments.

Figure 3:
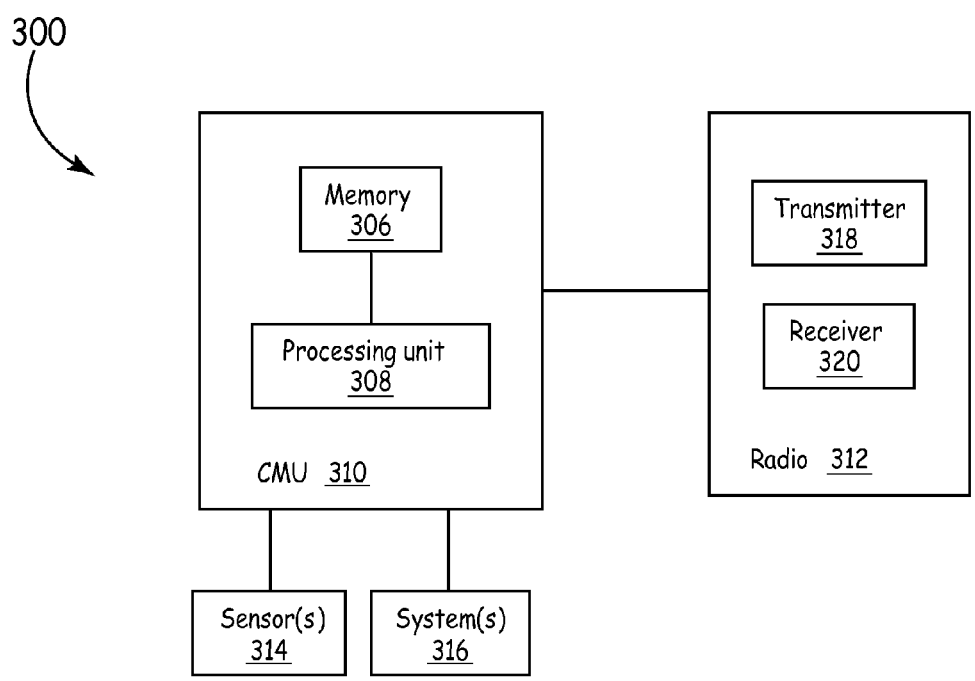
FIG. 3 is a block diagram of one embodiment of an avionics communication system in an aircraft.

FIG. 3 is a block diagram of an avionics system 300 for use on board aircraft 102 to implement a dynamic threshold. System 300 includes a communications management unit (CMU) 310 which communicates with a radio 312 to transmit and receive signals as well as to implement the dynamic threshold. System 300 also includes one or more sensors 314 and one or more onboard systems 316 coupled to CMU 310. Sensors 314, such as fuel consumption sensors, altitude sensors, etc. provide data to CMU 310 for transmission to a ground station 104. Similarly, onboard systems 316, such as a Flight Management System (FMS), provide data to CMU 310 for transmission to the ground station.

Radio 312 transmits data from CMU 310 to a ground station 104. Radio 312 also provides data received from a ground station 104 to CMU 310. In particular, radio 312 includes a transmitter 318 operable to modulate and upconvert data from CMU 310 for transmission over a selected radio frequency channel as known to one of skill in the art. Similarly, a receiver 320 in radio 312 is operable to downconvert and demodulate received RF signals from a ground station for processing by CMU 310 as known to one of skill in the art. It is to be understood that, although the transmitter 318 and receiver 320 are shown as separate devices in FIG. 3, in some implementations, the receiver 318 and transmitter 320 are integrated into a single device (sometimes referred to as a "transceiver"). In addition, radio 312 measures the signal strength of signals received from ground stations 104 within range of radio 312. Radio 312 provides the measured signal strength for each ground station 104 to CMU 310 for use in selecting a ground station with which to communicate.

CMU 310 comprises a processing unit 308 and a memory 306. Processing unit 308 can be implemented using software, firmware, hardware, or any appropriate combination thereof, as known to one of skill in the art. By way of example and not by way of limitation, the hardware components can include one or more microprocessors, memory elements, digital signal processing (DSP) elements, interface cards, and other standard components known in the art. Any of the foregoing may be supplemented by, or incorporated in, specially-designed application-specific integrated circuits (ASIC) and field programmable gate arrays (FPGA). In this exemplary embodiment, processing unit 308 includes or functions with software programs, firmware or computer readable instructions for carrying out various methods, process tasks, calculations, and control functions, used in calculating a dynamic threshold for switching ground stations. These instructions are typically tangibly embodied on any appropriate medium used for storage of computer readable instructions or data structures. In particular, in this embodiment, the instructions are stored on memory 306.

The memory 306 can be implemented as any available media that can be accessed by a general purpose or special purpose computer or processor, or any programmable logic device. Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media such as electrical, electromagnetic, or digital signals, conveyed via a communication medium such as a network and/or a wireless link.

Processing unit 308 calculates a difference in signal strength between the currently selected ground station and each other ground station within range of radio 312. Processing unit 308 then compares the calculated differences to a dynamic threshold value. If a difference in signal strength exceeds the threshold value, processing unit 308 initiates hand-off procedures to switch communication from the currently selected ground station to the new ground station having the stronger signal strength. Hand-off procedures are known to one of ordinary skill in the art and are not discussed in more detail here.

In some embodiments, if more than one calculated difference exceeds the threshold, processing unit 308 selects the ground station corresponding to the calculated difference having the strongest signal strength. In other embodiments, processing unit 308 selects the first ground station for which the corresponding calculated difference exceeds the threshold. It is to be understood that other factors can be included in the selection of a ground station when more than one ground station corresponds to a difference which exceeds the threshold value. For example, other factors can include, but are not limited to, a distance to each ground station, and direction of travel of the aircraft 102 with respect to each ground station 104 (e.g. toward or away from), etc.

In dynamically adjusting the threshold used in the above comparison, processing unit 308 monitors the signal strength of signals received from the currently selected ground station 104. As the signal strength changes, processing unit 308 adjusts the dynamic threshold. In particular, in this embodiment, processing unit 308 compares the current signal strength to ranges of values stored in memory 306. In particular, the ranges can be stored in a table such as Table 1 below:

TABLE 1

| Dynamic threshold value | Ranges of signal strength values |
| --- | --- |
| 5 dB | Less than −80 dBm |
| 10 dB | Between −80 dBm and −60 dBm |
| 15 dB | Between −60 dBm and −40 dBm |
| 20 dB | Between −40 dBm and −20 dBm |
| 25 dB | Greater than −20 dBm |

Hence, in this exemplary embodiment, if the current signal strength is between −80 dBm and −60 dBm, processing unit 308 sets the dynamic threshold for switching ground stations at 10 dB. Processing unit 308 does not initiate hand-off procedures until the signal strength corresponding to a new ground station exceeds the signal strength corresponding to the current ground station by 10 dB. In other words the calculated difference in signal strength exceeds 10 dB. Notably, the values provided in Table 1 are provided by way of example, and it is to be understood that other values can be used in other embodiments. In addition, although five separate values are used for the dynamic threshold value, more or less values can be used in other embodiments. In addition, as used herein, a table is any data structure for storing data such as, but not limited to, a keyed relational database, a linked list, a flat-file record, etc.

By using a dynamic threshold for switching ground stations, system 300 more efficiently manages network traffic to reduce network congestion by limiting ground station hand-offs when not necessary. For example, in some areas, such as near large airports, multiple ground stations are available for communication with aircraft 102. In such areas, the signal strength of a signal from the currently selected ground station may be sufficiently strong for communication even though the signal strength of a signal from another ground station may be stronger. Switching to the other ground station is unnecessary, despite the stronger signal strength, because the current signal strength is still sufficiently strong. Thus, system 300 dynamically adjusts the threshold for switching ground stations to avoid the unnecessary transmission of data during hand-off procedures which would contribute to network congestion.

Figure 4:
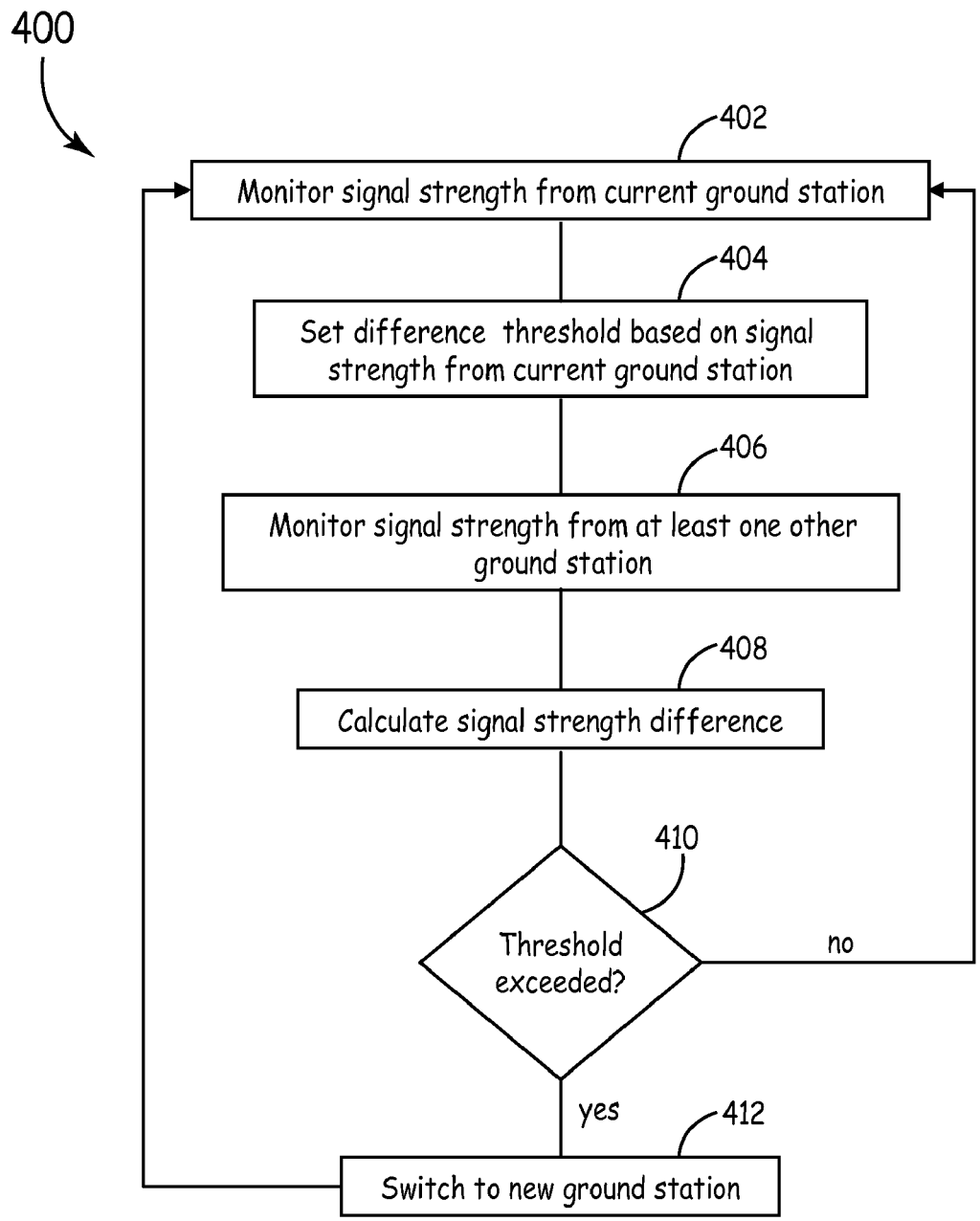
FIG. 4 is a flow chart depicting one embodiment of a method of selecting a ground station.

FIG. 4 is a flow chart of one embodiment of a method 400 of switching ground stations implemented by avionics system 300. In some embodiments, at least a portion of method 400 is implemented in processor instructions stored on memory 306 and executed by processing unit 308. At block 402, processing unit 308 in CMU 310 monitors the signal strength of signals received from the currently selected ground station. In particular, radio 312 periodically provides a measurement of the signal strength to CMU 310. For example, a measurement of signal strength can be provided based on a set time schedule, in some implementations, or with each reception of a signal from a ground station 104, in other embodiments.

At block 404, the processing unit 308 sets the threshold value for switching ground stations based on the current signal strength of signals from the currently selected ground station. At 406, the processing unit 308 monitors the signal strength corresponding to at least one other ground station within range of radio 312. In some embodiments, processing unit 308 looks up a threshold value in a table, such as Table 1, based on the measured signal strength provided by the radio 312. In other embodiments, processing unit 308 uses other techniques for setting the threshold value. For example, an exemplary method of setting the threshold value based on the measured signal strength corresponding to the currently selected ground station is discussed hereafter with respect to FIG. 5.

At block 408, the processing unit 308 calculates the difference in signal strength between each of the other ground stations and the currently selected ground station. In particular, the processing unit 308 subtracts the signal strength value of the currently selected ground station from the signal strength value of each of the other ground stations. At block 410, the processing unit 308 compares the signal strength difference for each other ground station calculated at block 408 with the threshold set at block 404. If the calculated difference does not exceed the set threshold, method 400 returns to block 402 to continue monitoring the signal strength corresponding to the currently selected ground station.

If the calculated difference does exceed the set threshold, processing unit 308 initiates, at block 412, hand-off procedures to switch to the ground station corresponding to the signal strength difference which exceeded the set threshold. If more than one calculated difference exceed the threshold, processing unit 308 selects the ground station with the strongest signal strength in some embodiments. In other embodiments, processing unit 308 selects from among the corresponding ground stations based on other factors, such as distance to the corresponding ground stations.

Figure 5:
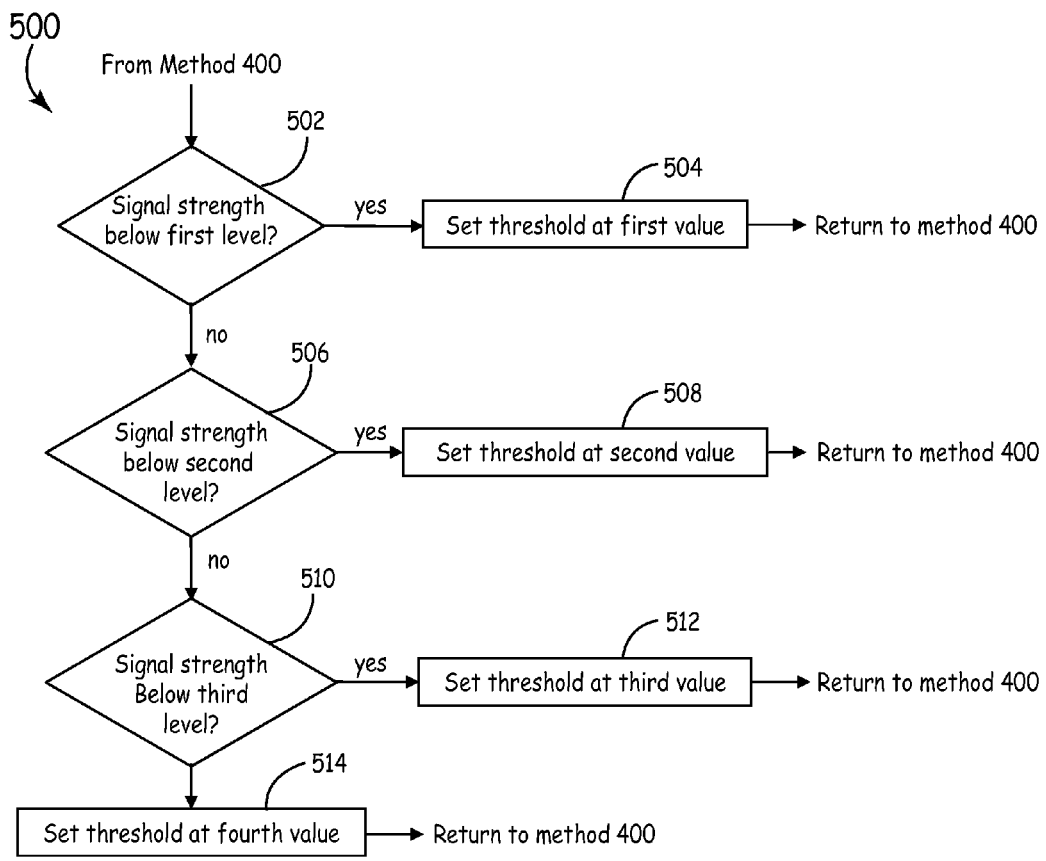
FIG. 5 is a flow chart depicting one embodiment of a method of setting relative signal strength thresholds as a function of absolute signal strength.

FIG. 5 is a flow chart depicting one embodiment of a method 500 of setting a dynamic threshold implemented by processing unit 308 in setting the threshold at block 404 in method 400. At block 502, the processing unit 308 compares the measured signal strength corresponding to the currently selected ground station to a first signal strength level. If the measured signal strength is weaker than the first signal strength level, the processing unit 308 sets the threshold value at a first difference value at block 504. For example, the processing unit can change the value of a field stored in memory 306 to indicate that the first difference value is to be used as the threshold value. Method 500 then returns to method 400.

If the measured signal strength is the same as or stronger than the first signal strength level, the processing unit 308 compares the measured signal strength to a second signal strength level at block 506. If the measured signal strength is weaker than the second signal strength level, the processing unit 308 sets the threshold value at a second difference value at block 508. Method 500 then returns to method 400. If the measured signal strength is the same as or stronger than the second signal strength level, the processing unit 308 compares the measured signal strength to a third signal strength value at block 510. If the measured signal strength is weaker than the third signal strength value, the processing unit 308 sets the difference threshold to a third difference value at block 512. Method 500 then returns to method 400. If the measured signal strength is the same as or stronger than the third signal strength level, the processing unit 308 sets the difference threshold at a fourth difference value at block 514. Method 500 then returns to method 400. It is to be understood that, although four difference values are used in this exemplary embodiment, variations of method 500 can be made in order to accommodate more or less numbers of values for the difference threshold.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A communication system comprising:
a radio to transmit and receive communication signals to and from a selected ground station; and
a management unit coupled to the radio and operable to dynamically set a threshold value for selecting another ground station based on a signal strength corresponding to the selected ground station;
wherein the management unit is operable to select another ground station when a signal strength corresponding to the other ground station exceeds the signal strength corresponding to the selected ground station by more than the threshold value set by the management unit.

2. The communication system of claim 1, wherein the radio is operable to measure and provide to the management unit the signal strength corresponding to the selected ground station and the signal strength corresponding to the other ground station.

3. The communication system of claim 1, wherein the management unit comprises:
a memory operable to store a plurality of threshold values; and
a processing unit operable to select one of the plurality of threshold values stored in the memory based on the signal strength corresponding to the selected ground station;
wherein the processing unit is operable to select another ground station when a signal strength corresponding to the other ground station exceeds the signal strength corresponding to the selected ground station by more than the selected threshold value.

4. The communication system of claim 3, wherein the plurality of threshold values are stored in a table with associated signal strength ranges;
   wherein the processing unit selects the threshold value in the table that is associated with the signal strength range covering the signal strength corresponding to the selected ground station.

5. The communication system of claim 1, wherein the management unit is operable to set a threshold value to one of a finite number of values.

6. The communication system of claim 5, wherein the finite number of values are 5 decibels (dB), 10 dB, 15 dB, 20 dB, and 25 dB.

7. The communication system of claim 1, further comprising:
   at least one sensor operable to provide sensor data to the management unit for transmission to the selected ground station; and
   at least one onboard system to provide data to the management unit for transmission to the selected ground station.

8. A method of switching ground stations, the method comprising:
   monitoring a signal strength corresponding to a currently selected ground station and a signal strength corresponding to one or more other ground stations;
   setting a threshold value based on the monitored signal strength corresponding to the currently selected ground station;
   calculating a difference between the monitored signal strength corresponding to the currently selected ground station and the monitored signal strength corresponding to each of the one or more other ground stations; and
   if the calculated difference corresponding to one of the one or more other ground stations exceeds the set threshold value, selecting that other ground station to replace the currently selected ground station.

9. The method of claim 8, wherein monitoring a signal strength comprises receiving a measured signal strength from a radio receiver.

10. The method of claim 8, wherein setting the threshold value comprises looking-up in a table the threshold value associated with a range of signal strengths that covers the monitored signal strength corresponding to the currently selected ground station.

11. The method of claim 8, wherein setting the threshold value comprises:
   comparing the monitored signal strength corresponding to the currently selected ground station with a first signal strength level;
   if the monitored signal strength corresponding to the currently selected ground station is weaker than the first signal strength level, setting the threshold value to a first value;
   if the monitored signal strength corresponding to the currently selected ground station is the same as or exceeds the first signal strength level, comparing the monitored signal strength corresponding to the currently selected ground station with a second signal strength level;
   if the monitored signal strength corresponding to the currently selected ground station is weaker than the second signal strength level, setting the threshold value to a second value; and
   if the monitored signal strength corresponding to the currently selected ground station is the same as or exceeds the second signal strength level, setting the threshold value to a third value.

12. The method of claim 8, wherein setting the threshold value comprises setting the threshold value to one of a finite number of values based on the monitored signal strength corresponding to the currently selected ground station.

13. The method of claim 12, wherein setting the finite number of values includes 5 decibels (dB), 10 dB, 15 dB, 20 dB, and 25 dB.

14. The method of claim 8, further comprising:
   if the calculated difference corresponding to more than one of the other ground stations exceeds the set threshold value, selecting one of those other ground stations that corresponds to the strongest signal strength.

15. A program product comprising a non-transitory processor-readable medium on which program instructions are embodied, wherein the program instructions are operable, when executed by at least one programmable processor included in a management unit that selects a ground station with which to communicate, to cause the programmable processor to:
   dynamically set a threshold based on a monitored signal strength corresponding to a currently selected ground station;
   calculate a difference between the monitored signal strength and a signal strength corresponding to each of one or more other ground stations;
   compare each of the calculated differences to the dynamically set threshold; and
   initiate procedures to switch communication from the currently selected ground station to the other ground station corresponding to the difference that exceeded the dynamically set threshold.

16. The program product of claim 15, wherein the program instructions are further operable to cause the programmable processor to dynamically set the threshold by retrieving, from a table in a memory coupled to the programmable processor, a threshold value corresponding to a signal strength range that covers the monitored signal strength corresponding to the currently selected ground station.

17. The program product of claim 15, wherein the program instructions are further operable to cause the programmable processor to:
   compare the monitored signal strength corresponding to the currently selected ground station with a first signal strength level;
   dynamically set the threshold to a first value if the monitored signal strength corresponding to the currently selected ground station is weaker than the first signal strength level;
   compare the monitored signal strength corresponding to the currently selected ground station with a second signal strength level if the monitored signal strength corresponding to the currently selected ground station is the same as or exceeds the first signal strength level;
   set the threshold to a second value if the monitored signal strength corresponding to the currently selected ground station is weaker than the second signal strength level;
   compare the monitored signal strength corresponding to the currently selected ground station with a third signal strength level if the monitored signal strength corresponding to the currently selected ground station is the same as or exceeds the second signal strength level; and set the threshold value to a third value if the monitored signal strength corresponding to the currently selected ground station is weaker than the third signal strength level.

18. The program product of claim 15, wherein the program instructions are further operable to cause the programmable processor to receive the monitored signal strength corresponding to the currently selected ground station from a radio coupled to the management unit.

19. The program product of claim 15, wherein the program instructions are further operable to cause the programmable processor to dynamically set the threshold to one of a finite number of values based on the monitored signal strength corresponding to the currently selected ground station.

20. The program product of claim 19, wherein the program instructions are further operable to cause the programmable processor to dynamically set the threshold to one of 5 decibels (dB), 10 dB, 15 dB, 20 dB, and 25 dB.

* * * * *